United States Patent
Ihara (10) Patent No.: US 8,790,503 B2
(45) Date of Patent: Jul. 29, 2014

(54) METHOD FOR FORMING ANODIZED LAYER

(75) Inventor: Ichiroh Ihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/643,721

(22) PCT Filed: Apr. 26, 2011

(86) PCT No.: PCT/JP2011/060179
§ 371 (c)(1),
(2), (4) Date: Oct. 26, 2012

(87) PCT Pub. No.: WO2011/136229
PCT Pub. Date: Nov. 3, 2011

(65) Prior Publication Data
US 2013/0037412 A1 Feb. 14, 2013

(30) Foreign Application Priority Data
Apr. 28, 2010 (JP) ................................. 2010-104052

(51) Int. Cl.
*C25D 21/12* (2006.01)
*C25D 11/12* (2006.01)
*C25D 11/24* (2006.01)

(52) U.S. Cl.
USPC .............. 205/83; 205/223; 205/316; 205/324

(58) Field of Classification Search
USPC ........................................................ 205/83
See application file for complete search history.

(56) References Cited

U.S. PATENT DOCUMENTS

| 6,359,735 | B1 | 3/2002 | Gombert et al. |
| 2003/0205475 | A1 | 11/2003 | Sawitowski |
| 2007/0159698 | A1 | 7/2007 | Taguchi et al. |
| 2007/0289874 | A1 * | 12/2007 | Masuda et al. ................ 205/171 |

FOREIGN PATENT DOCUMENTS

| JP | 63038599 A | 2/1988 |
| JP | 8199396 A | 8/1996 |
| JP | 2001517319 A | 10/2001 |
| JP | 2003531962 A | 10/2003 |
| JP | 2005156695 A | 6/2005 |
| WO | WO-2006059686 A1 | 6/2006 |

OTHER PUBLICATIONS

Lee et al., "Fast Fabrication of Long-Range Ordered Porous Alumina Membranes by Hard Anodization" Nat. Mater. 5, pp. 741-747 (2006).*
Mor et al., "A Review of Highly Ordered, Vertically Oriented TiO2 Nanotube Arrays: Fabrication, Material Properties, and Solar Energy Applications" Sol. Energ. Mat. Sol. C. 90, pp. 2011-2075 (2006).*

(Continued)

Primary Examiner — Bryan D. Ripa
(74) Attorney, Agent, or Firm — Harness, Dickey & Pierce, P.L.C.

(57) ABSTRACT

An anodized layer formation method includes: (a) providing an aluminum base or an aluminum film deposited on a support; anodization step (b) in which a forming voltage is increased to a predetermined first voltage level under a predetermined condition with a surface of the aluminum base or a surface of the aluminum film being kept in contact with an electrolytic solution, and thereafter, the forming voltage is maintained at the first voltage level for a predetermined period of time, whereby a porous alumina layer which has a minute recessed portion is formed; and etching step (c) in which, after step (b), the porous alumina layer is brought into contact with an etching solution, whereby the minute recessed portion is enlarged and a lateral surface of the minute recessed portion is sloped.

2 Claims, 5 Drawing Sheets

(56) References Cited

OTHER PUBLICATIONS

Nagaura et al., "Fabrication and Structural Control of Anodic Alumina Films with Inverted Cone Porous Structure Using Multi-Step Anodizing" Electrochim. Acta 53, pp. 2109-2114 (2008).*

International Search Report PCT/ISA/210 for International Application No. PCT/JP2011/060179 dated Aug. 1, 2011.
International Preliminary Report on Patentability dated Dec. 20, 2012.

* cited by examiner

METHOD FOR FORMING ANODIZED LAYER

TECHNICAL FIELD

The present invention relates to an anodized layer formation method and a mold manufacturing method. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method for forming a moth-eye structure, using an anodized porous alumina layer which is obtained by means of anodization (or "anodic oxidation") of aluminum has been receiving attention (Patent Documents 2 to 4).

Now, the anodized porous alumina layer which is obtained by means of anodization of aluminum is briefly described. Conventionally, a method for forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage (which is referred to as "forming voltage"), which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer manufactured under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method for producing an antireflection film (antireflection surface) with the use of a stamper which has an anodized porous alumina film over its surface.

Patent Document 3 discloses the technique of forming tapered minute recessed portions with continuously changing pore diameters by repeating anodization of aluminum and a pore diameter increasing process.

The present applicant discloses in Patent Document 4 the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the unevenness which is capable of performing the antiglare function is not less than 1 µm and less than 100 µm. The entire disclosures of Patent Documents 1, 2, and 4 are herein incorporated by reference.

Utilizing such an anodized porous aluminum film can facilitate the manufacturing of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

CITATION LIST

Patent Literature

Patent Document 1: Japanese PCT National Phase Laid-Open Publication No. 2001-517319
Patent Document 2: Japanese PCT National Phase Laid-Open Publication No. 2003-531962

Patent Document 3: Japanese Laid-Open Patent Publication No. 2005-156695
Patent Document 4: WO 2006/059686

SUMMARY OF INVENTION

Technical Problem

However, the present inventor conducted research and found that, since the recessed portions of a porous alumina layer which is obtained according to the methods disclosed in Patent Documents 3 and 4 have stepped lateral surfaces, raised portions of an antireflection film which is produced using the porous alumina layer as a mold also have stepped lateral surfaces. As a result, there is a problem that the reflectance of light at a particular wavelength is higher than the reflectances of light at the other wavelengths so that the antireflection film can be observed as having a hue. Occurrence of this problem can be prevented by repeating the anodization step and the etching step many times with short intervals, although the throughput of an anodized layer decreases.

The present invention was conceived for the purpose of solving the above problems. One of the major objects of the present invention is to provide a method for forming an anodized layer that has minute recessed portions with sloped lateral surfaces, which are substantially free from steps, through a simple process.

Solution to Problem

An anodized layer formation method of the present invention includes: step (a) of providing an aluminum base or an aluminum film deposited on a support; anodization step (b) in which a forming voltage is increased to a predetermined first voltage level under a predetermined condition with a surface of the aluminum base or a surface of the aluminum film being kept in contact with an electrolytic solution, and thereafter, the forming voltage is maintained at the first voltage level for a predetermined period of time, whereby a porous alumina layer which has a minute recessed portion is formed; and etching step (c) in which, after step (b), the porous alumina layer is brought into contact with an etching solution, whereby the minute recessed portion is enlarged and a lateral surface of the minute recessed portion is sloped.

In one embodiment, the method further includes a second cycle of step (b) after step (c), wherein a voltage applied at a start of the second cycle of step (b) is higher than a voltage applied at a start of the first cycle of step (b).

In one embodiment, the first voltage is not less than 20 V and less than 100 V.

In one embodiment, the predetermined condition in step (b) is determined such that the forming voltage and an accumulated quantity of electricity satisfy a predetermined relationship. In that case, the anodization is carried out with only the surface being in contact with the electrolytic solution.

Advantageous Effects of Invention

According to the present invention, a method for forming an anodized layer that includes minute recessed portions with sloped lateral surfaces, which are substantially free from steps, through a simple process is provided. The anodized layer of the present invention is suitably used as, for example, a mold which is for production of an antireflection film.

BRIEF DESCRIPTION OF DRAWINGS

FIG. 1 (a) to (d) are schematic cross-sectional views for illustrating an anodized layer formation method of an embodiment of the present invention.

FIG. 3 (a) is a cross-sectional SEM image of a minute recessed portion of a porous alumina layer that was formed according to a method of an example of the present invention. (b) is a cross-sectional SEM image of a minute recessed portion of a porous alumina layer that was formed according to a conventional method.

FIGS. 6 (a) and (b) are graphs which illustrate the relationship between the accumulated amount of electricity and the forming voltage in an anodization step of an anodized layer formation method of an embodiment of the present invention.

FIG. 8 (a) to (d) are schematic cross-sectional views for illustrating the mechanism of formation of a porous alumina layer.

FIGS. 9 (a) and (b) are schematic diagrams illustrating shapes of minute recessed portions of a porous alumina layer which is formed according to a conventional anodized layer formation method.

DESCRIPTION OF EMBODIMENTS

Hereinafter, an anodized layer formation method, a mold manufacturing method, and an antireflection film production method with the use of a mold according to an embodiment of the present invention are described with reference to the drawings. Note that, however, the present invention is not limited to the embodiment exemplified below.

First, for the sake of comparison, a method for forming an anodized layer of a moth-eye mold that is for production of an antireflection film is described.

As described above, the period (pitch) of minute recessed portions or the average adjoining distance (the distance between the centers of minute recessed portions) of an anodized porous alumina layer depends on the level of a voltage which is applied during anodization (forming voltage). Therefore, in a conventional anodized layer formation method, the voltage applied during anodization is set such that the minute recessed portions are arranged with a desired pitch or average adjoining distance.

A mechanism through which a porous alumina layer is formed by anodizing a surface of an aluminum base is described with reference to FIG. 7 and FIG. 8.

Figure 7:
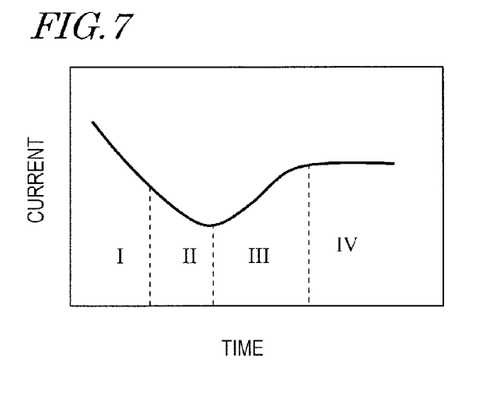
FIG. 7 A graph for illustrating the mechanism of formation of a porous alumina layer, showing the variation of a current over time during anodization with a constant voltage.
Figure 8:
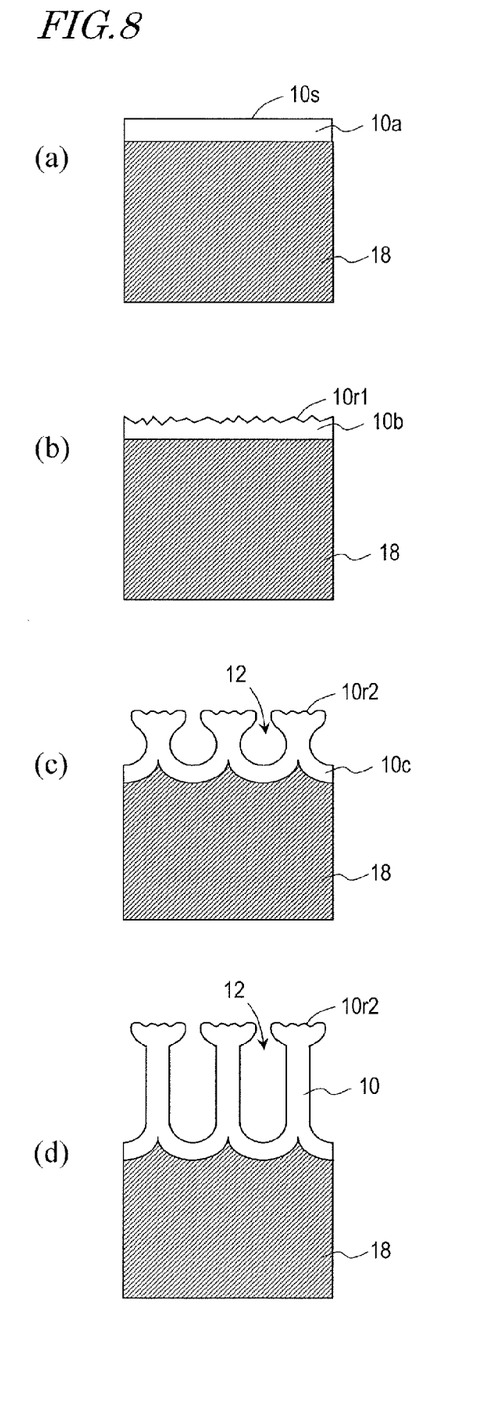

FIG. 7 is a graph showing the variation of a current over time during anodization with a constant voltage. FIG. 8(a), FIG. 8(b), FIG. 8(c) and FIG. 8(d) schematically show the states of an aluminum base, respectively corresponding to the four modes I, II, III and IV of FIG. 7.

When a surface of an aluminum base is anodized in an electrolytic solution with a constant voltage, the current varies as shown in FIG. 7. According to this current variation profile, the anodization can be separated into the four modes I, II, III and IV. The respective modes are described with reference to FIG. 8(a), FIG. 8(b), FIG. 8(c) and FIG. 8(d).

Mode I (FIG. 8(a)): An anodized alumina layer 10a (sometimes simply referred to as "film") formed over a surface of an aluminum base 18 is very thin, so that there is an anodic field in the film 10a and at the interface between the film 10a and the electrolytic solution. Since the electric field is intense, the concentration of anion $A^{m-}$ at the interface does not substantially depend on the pH of the solution, and the dissolution rate would not vary depending on the pH. Thus, substantially the same reaction occurs irrespective of the type of the electrolytic solution. Here, a surface 10s of the film 10a is flat.

Mode II (FIG. 8(b)): As the thickness of a film 10b increases, a surface 10r1 of the film 10b becomes slightly rough. Thus, the surface 10r1 has minute recessed and raised portions. Due to these recessed and raised portions, the distribution of the current density becomes nonuniform, leading to local dissolution.

Mode III (FIG. 8(c)): Part of the roughness (recessed and raised portions) produced in the surface 10r1 in Mode II grow to form minute recessed portions 12. The metal/film interface (the interface between the aluminum base 18 and an anodized alumina layer 10c) is deformed into the shape of a bowl, so that the area of local dissolution increases. As a result, the total apparent current increases. The dissolution is restricted within the bottoms of the minute recessed portions 12 at which the electric field density is strongest.

Mode IV (FIG. 8(d)): The minute recessed portions (micropores) 12 stably grow. Here, the minute recessed portions 12 grow with their bottom surface areas being maintained constant, so that the lateral surfaces of the minute recessed portions 12 are perpendicular to the layer plane of the porous alumina layer.

As described above, Patent Documents 3 and 4 disclose the methods of forming an anodized layer that is used as a moth-eye mold which is suitable to production of an antireflection film. One outstanding feature of the methods resides in that the anodization step and the etching step are alternately repeated.

For example, Patent Document 3 discloses that the anodization step where the voltage of 40 V was applied for 50 seconds in a 0.3M oxalic acid aqueous solution and the etching step where the material was immersed in a 2 mass % phosphoric acid aqueous solution (30° C.) for 5 minutes (pore diameter increasing process) were alternately repeated through 5 cycles, whereby tapered minute recessed portions with the period of 100 nm, the opening diameter of 80 nm, the depth of 300 nm, and the bottom portion of 25 nm were formed.

Patent Document 4 discloses that, after removal of a first-formed anodized porous alumina layer, the anodization step where the voltage of 80 V was applied for 30 seconds in a 0.05 mol/L oxalic acid aqueous solution and the etching step where the material was immersed in 1 mol/L phosphoric acid (30° C.) for 19 minutes were alternately repeated through cycles, and thereafter, another cycle of anodization was performed under the same conditions, whereby minute recessed portions with the average adjoining distance of about 200 nm (non-periodic) and the depth of about 840 nm (aspect ratio: about 4.2) were formed. It is also disclosed that, since the process was finished with the anodization step, the deepest part of the minute recessed portions substantially had a pointed end (did not have an area).

Figure 9:
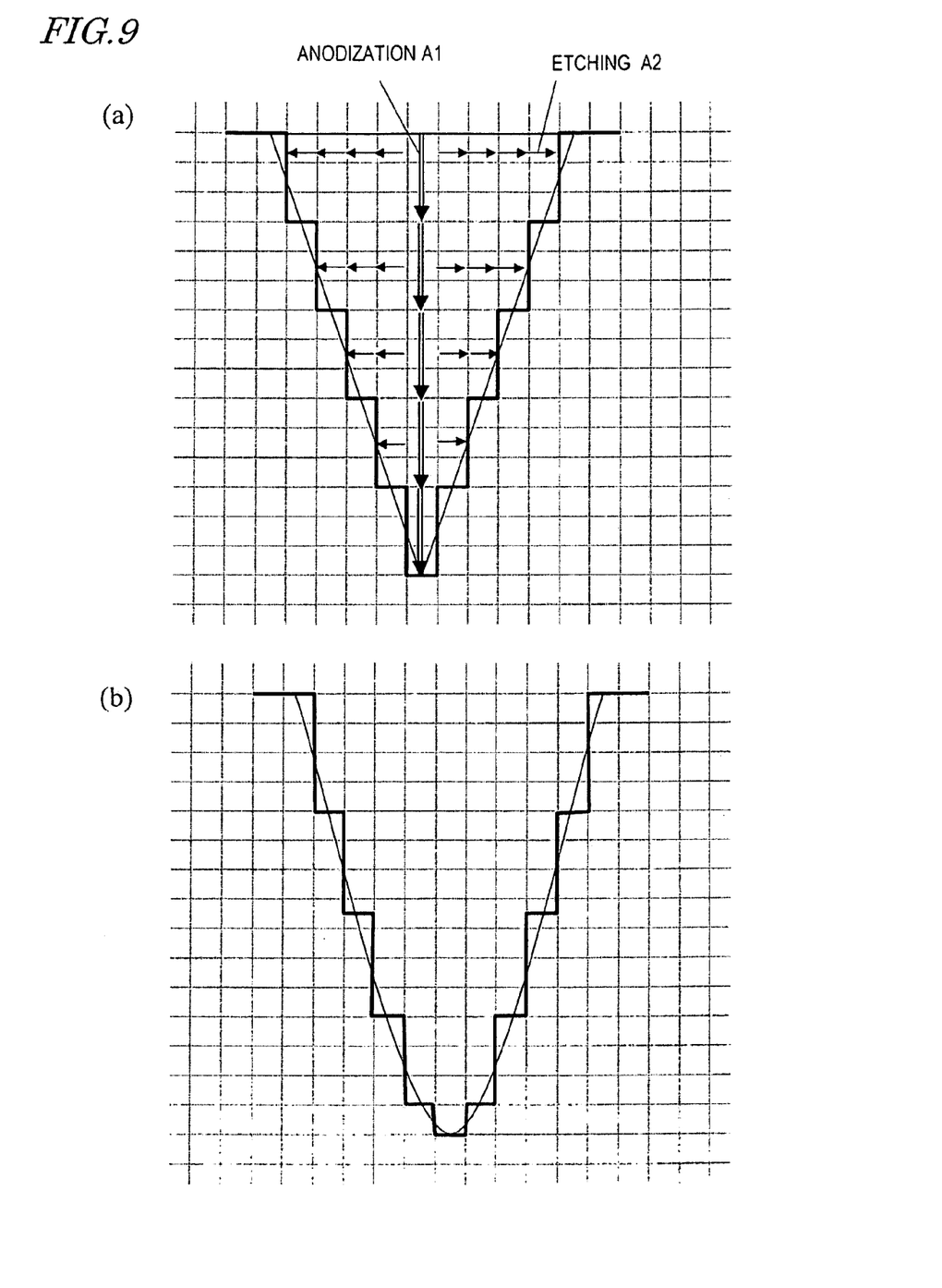

As disclosed in Patent Document 4, the shape of the minute recessed portions can be controlled by adjusting the minute recessed portion formation amount (growth amount) and the etching amount in the anodization step and the etching step that are performed through a plurality of cycles. For example, by repeating the step of growing the minute recessed portions in the depth direction (arrow A1) by means of anodization and the step of enlarging the openings of the minute recessed portions in the in-plane direction of the alumina layer (arrow A2) by means of etching under the same conditions in the respective steps, the resultant minute recessed portions have a stepped cross section which is formed by repetition of a constant step height (corresponding to 3 squares) and a constant step width (corresponding to 1 square) as shown in FIG. 9(a). By repeating the anodization step and the etching step many times with short intervals, the minute recessed portions having a generally conical shape can be obtained. Also, the process is finished with the anodization step so that the area of the bottom of the minute recessed portions can be decreased. Specifically, the deepest part of the minute recessed portions substantially has a pointed end. Further, the minute recessed portions can be formed so as to have a stairway-like shape in which the step height is smaller in deeper part as shown in FIG. 9(b). Note that raised portions which are obtained by inverting such minute recessed portions have a bell-like shape and provide excellent antireflection effect.

The porous alumina layer of a moth-eye mold which is for production of an antireflection film preferably has minute recessed portions which are generally configured such that the two-dimensional size (opening diameter: Dp) is not less than 10 nm and less than 500 nm and the depth ($D_{depth}$) is not less than 10 nm and less than 1000 nm (1 µm). It is also preferred that the bottom portion of the minute recessed portions is tapered (with the deepest part of the bottom portion being pointed) as disclosed in Patent Document 4. Further, it is preferred that the minute recessed portions are in a closely packed arrangement. Assuming that the shape of the minute recessed portions when viewed in a direction normal to the film is a circle, it is preferred that adjacent circles overlap each other, and a saddle portion is formed between adjacent ones of the minute recessed portions (see FIG. 17 and FIG. 18 of Patent Document 4). Note that, when the generally-conical minute recessed portions adjoin one another so as to form saddle portions, the two-dimensional size of the minute recessed portions, $D_p$, is equal to the average adjoining distance $D_{int}$ (the distance between the centers of the minute recessed portions). Thus, the porous alumina layer of the moth-eye mold that is for production of the antireflection film preferably has a configuration in which the minute recessed portions are in an irregular closely-packed arrangement, the minute recessed portions having such dimensions that $D_p=D_{int}$ is not less than 10 nm and less than 500 nm and $D_{depth}$ is generally not less than 10 nm and less than 1000 nm (1 µm). The thickness of the porous alumina layer is generally not more than 1 µm.

An anodized layer formation method of an embodiment of the present invention includes: step (a) of providing an aluminum base or an aluminum film deposited on a support; anodization step (b) in which a forming voltage is increased to a predetermined first voltage level under a predetermined condition with a surface of the aluminum base or a surface of the aluminum film being kept in contact with an electrolytic solution, and thereafter, the forming voltage is maintained at the first voltage level for a predetermined period of time, whereby a porous alumina layer which has a minute recessed portion is formed; and etching step (c) in which, after step (b), the porous alumina layer is brought into contact with an etching solution, whereby the minute recessed portion is enlarged and a lateral surface of the minute recessed portion is sloped. One outstanding feature of the anodized layer formation method of the embodiment of the present invention resides in that, in the anodization step, the forming voltage is increased from a voltage level which is lower than the predetermined first voltage level to the first voltage level under a predetermined condition. This anodization step and the etching step that follows enable formation of an anodized layer that has minute recessed portions with sloped lateral surfaces, which are substantially free from steps.

The mechanism through which minute recessed portions with sloped lateral surfaces, which are substantially free from steps, are formed according to the anodized layer formation method of the embodiment of the present invention is described. Note that the description provided below is merely a study which is based on the fact experimentally confirmed by the present inventor and is provided as an aid for understanding the present invention. It is not intended to limit the present invention to the description provided below. The mechanism through which minute recessed portions with sloped lateral surfaces are formed according to the anodized layer formation method of the embodiment of the present invention can include two examples which are described below.

One mechanism example is such that, as the forming voltage is increased in the anodization step, the structure changes from a porous alumina layer with small $D_{int}$ to a porous alumina layer with large $D_{int}$. For example, in the second and subsequent cycles of the anodization step (FIG. 1(c)), a previously-formed porous alumina layer with large $D_{int}$ is etched, and a porous alumina layer that includes a barrier layer whose thickness is smaller than $D_{int}$ is anodized. Therefore, in the early phase of the anodization step, an electric current starts to flow at a voltage which is lower than the forming voltage that corresponds to $D_{int}$. When the anodization is performed with a low voltage, an electric current flows at a relatively-large bottom portion of the minute recessed portions, which has been enlarged by the etching, so that dissolution occurs. As the forming voltage increases, the region where an electric current flows converges on one point at the bottom portion of a recessed portion. As a result, when the forming voltage is increased, minute recessed portions which have sloped lateral surfaces are formed in the anodization step.

The other mechanism example is such that sloped lateral surfaces are formed according to the distribution of the etching rate. This phenomenon is described with reference to FIG. 5. Anodized alumina which is formed by anodization of aluminum is not pure $Al_2O_3$ but contains anion and hydrogen. In the alumina that contains these ingredients, there are many dangling bonds, and as a result, the etching rate increases. By gradually increasing the forming voltage such that the amount of hydrogen taken in the upper part of the minute recessed portions of the porous alumina layer (i.e., the part which is formed in the early phase of the anodization) is increased and the amount of hydrogen taken in the lower part (i.e., the part which is formed in the late phase of the anodization) is decreased, the lateral surfaces are sloped by etching. Even when sloped lateral surfaces are not formed in the anodization step, or even when the gradient of sloped lateral surfaces formed in the anodization step is small, the lateral surfaces can be sloped or the gradient angle of the lateral surfaces can be increased in the etching step.

Figure 5:
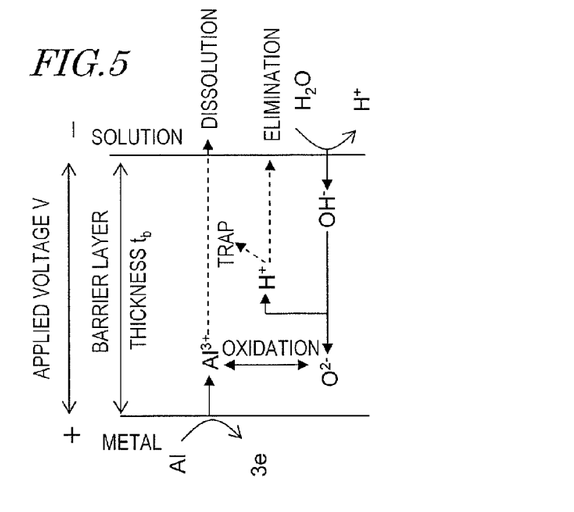
FIG. 5 A diagram for illustrating the mechanism of producing a variation in distribution of the hydrogen intake amount in a porous alumina layer according to an applied voltage in the anodization step.

Now, the mechanism through which the hydrogen intake amount varies depending on the voltage that is applied during the anodization is discussed. FIG. 5 illustrates the behavior of ions during the anodization in the vicinity of the interface between the porous alumina layer (the barrier layer portion at the bottom of the recessed portions) and the aluminum base. $OH^-$ produced by decomposition of $H_2O$ at the surface of the barrier layer enters the barrier layer. $OH^-$ in the barrier layer separates into $O^{2-}$ and $H^+$. $O^{2-}$ causes oxidation of aluminum. Meanwhile, since $H^+$ is electrically positive, if the electric field in the barrier layer is strong, $H^+$ is eliminated from the barrier layer by an electrical force. If the electric field in the barrier layer is weak, $H^+$ is trapped inside the barrier layer. Also, the probability that hydrogen is trapped decreases as the thickness of the barrier layer increases.

Thus, the probability that hydrogen is trapped, I, is generally expressed by Formula (1) shown below:

[Formula 1]

$$I \propto \frac{1}{E} \times \frac{1}{t_b} = \frac{t_b}{V} \times \frac{1}{t_b} = \frac{1}{V} \quad (1)$$

where V is the applied voltage and $t_b$ is the thickness of the barrier layer.

Thus, qualitatively, the hydrogen intake rate is inversely proportional to the applied voltage V. When the anodization is performed with a constant forming voltage from the start as is in the conventional procedure, it can be said from the above formula that the hydrogen intake rate is constant because the applied voltage V is constant. Therefore, the etching rate is constant along the depth direction of the minute recessed portions so that sloped lateral surfaces cannot be formed. On the other hand, when the anodization is performed with a gradually-increasing forming voltage as in the embodiment of the present invention, the hydrogen intake amount is smaller at a position which is closer to the bottom of the minute recessed portions. As a result, minute recessed portions with sloped lateral surfaces are formed in which the opening diameter is larger in a higher portion.

In an anodized layer formation method of an embodiment of the present invention, the forming voltage is controlled such that the forming voltage and the accumulated quantity of electricity satisfy a predetermined relationship. The accumulated quantity of electricity refers to the time integral of the quantity of a flowing electric current, which is expressed in C (coulomb). In anodization of aluminum, the reaction rate is 100%, and the amount of produced anodized alumina and the accumulated quantity of electricity are in a proportional relationship. Therefore, assuming that the area of an oxidized aluminum surface is constant, the accumulated quantity of electricity and the thickness of the film are proportional to each other. Note that, however, to strictly satisfy this relationship, the anodization need to be performed with only a surface to be anodized being in contact with an electrolytic solution. Thus, it is necessary to keep an electrode, and the like, away from the electrolytic solution.

Figure 6:
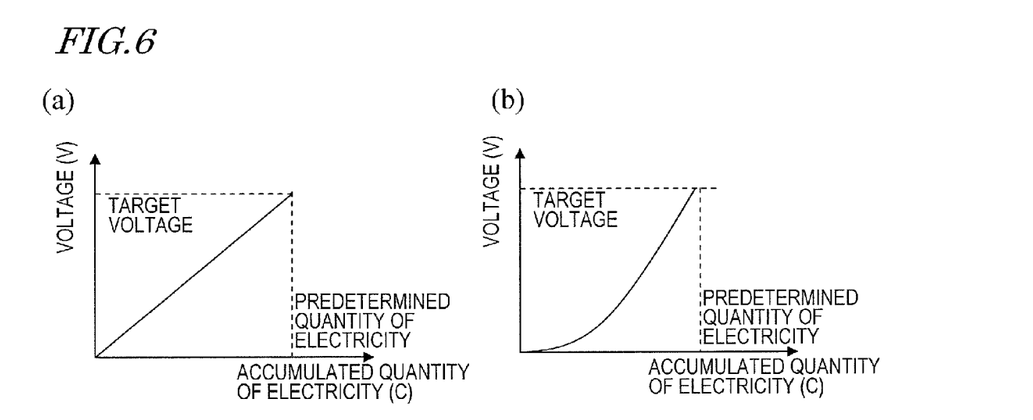

Now, refer to FIG. 6(a) where the horizontal axis represents the accumulated quantity of electricity, and the vertical axis represents the voltage. When the forming voltage is controlled such that the accumulated quantity of electricity is proportional to the voltage, linearly-sloped lateral surfaces can be obtained by the etching. Note that the target voltage (first voltage) is determined according to $D_{int}$ of a porous alumina layer which is to be formed, and the predetermined quantity of electricity is determined according to the designed film thickness. On the other hand, as shown in FIG. 6(b), when the forming voltage is controlled such that it is expressed as a downwardly convex quadratic curve, minute recessed portions which have an inverted bell-like cross-sectional structure can be obtained. Thus, by controlling the forming voltage based on the accumulated quantity of electricity, minute recessed portions which have an intended cross-sectional structure after the etching can be formed. As such, to obtain continuously-sloped lateral surfaces, it is preferred to control the forming voltage while monitoring the accumulated quantity of electricity such that the forming voltage is proportional to the accumulated quantity of electricity.

An anodized layer formation method of an embodiment of the present invention is described in detail with reference to FIG. 1 to FIG. 6. In the example which is described hereinafter, an anodized layer is formed over a surface of an aluminum base. However, an anodized layer may be formed over a surface of an aluminum film that is deposited on a support. The aluminum base does not include a thin film of aluminum, but refers to aluminum in bulk which is self-supporting and which is in the form of a plate with a thickness of not less than 2 mm, or in the form of a hollow cylinder or solid cylinder.

Figure 1:
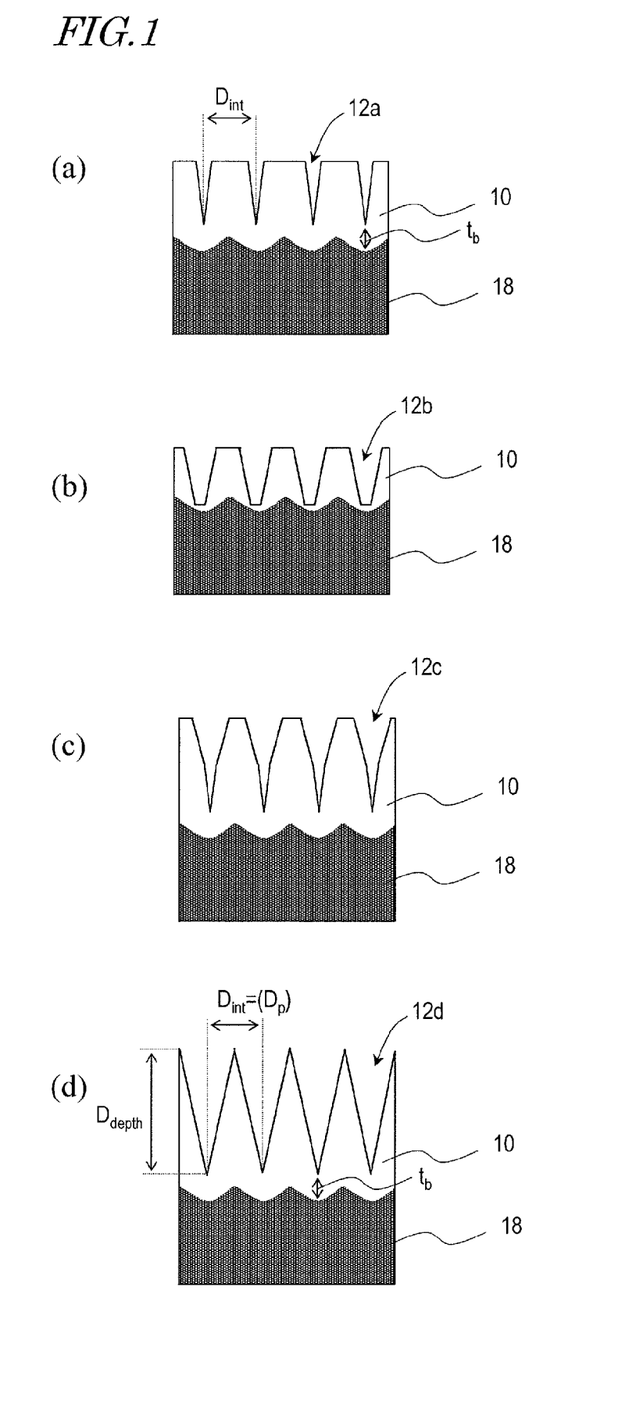
Figure 2:
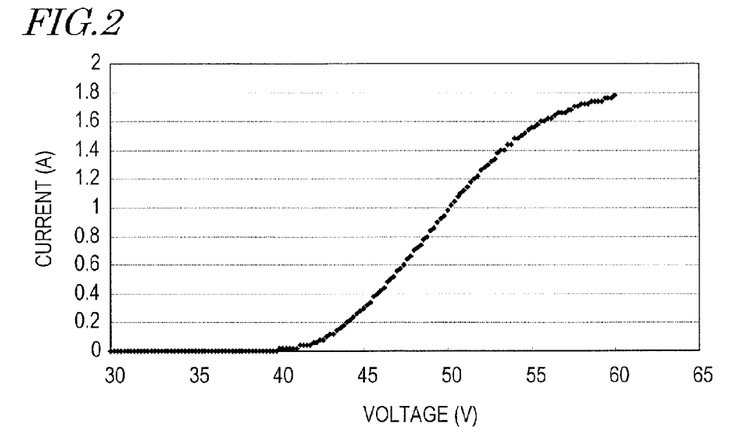
FIG. 2 A graph which illustrates the forming voltage-current characteristic in the second and subsequent cycles of an anodization step in an anodized layer formation method of an embodiment of the present invention.
Figure 3:
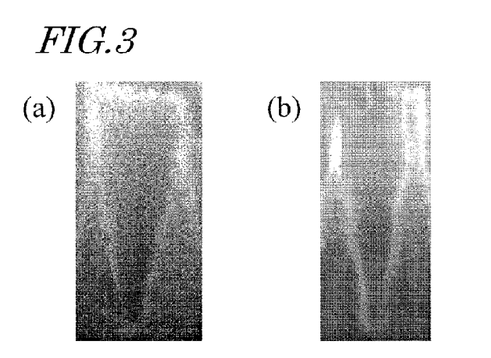

First, refer to FIG. 1. FIGS. 1(a) to 1(d) are schematic cross-sectional views for illustrating the anodized layer formation method of the embodiment of the present invention.

As shown in FIG. 1(a), a porous alumina layer 10 is formed which has minute recessed portions 12a in a surface of an aluminum base (e.g., substrate) 18. This step is realized by increasing the forming voltage to a predetermined first voltage with only a predetermined surface of the aluminum base 18 being in contact with an electrolytic solution and, thereafter, maintaining the forming voltage at the first voltage for a predetermined period of time.

An example is now discussed where, for example, an uneven structure is formed with the forming voltage of 60 V in a 0.1 M oxalic acid aqueous solution (20° C.) using the aluminum base 18 as the anode. In this case, a porous alumina layer 10 is formed in which average adjoining distance $D_{int}$ of the minute recessed portions is about 150 nm. Here, the thickness of the barrier layer, $t_b$, is 60 nm. Average adjoining distance $D_{int}$ of the minute recessed portions can be adjusted by selecting the type and temperature of the electrolytic solution and the forming voltage.

To form a porous alumina layer which has the above-described structure with excellent reproducibility, it is preferred that the anodization is performed relatively moderately. It is also preferred that the electrolytic solution used is a 0.05 M to 5 M oxalic acid aqueous solution (3-30° C.), and the forming voltage (first voltage) is not less than 20 V and less than 100 V.

In the anodized layer formation method of the present embodiment, the forming voltage is increased to the predetermined first voltage in the anodization step. In the case of linearly sloping the lateral surfaces of the minute recessed portions, the forming voltage is controlled so as to be proportional to the accumulated quantity of electricity as described above. For example, in the case of forming a porous alumina layer that has $D_{int}$ which corresponds to the forming voltage of 60 V and that has a thickness which corresponds to the accumulated quantity of electricity of 100 C (coulomb), the accumulated quantity of electricity, Q, is monitored during application of the voltage in the anodization step, and the voltage is controlled such that voltage E satisfies E=0.6×Q. Specifically, the voltage is controlled with the proportional relationship being maintained such that voltage E is 60 V when the accumulated quantity of electricity Q reaches 100 C. In the first cycle of the anodization step, it is preferred that the increase of the forming voltage is started from 0 V as exemplified herein.

Then, the porous alumina layer 10 is brought into contact with an etching solution, whereby the minute recessed portions 12a are enlarged, and the lateral surfaces of the minute recessed portions 12a are sloped. In this way, minute recessed portions 12b which have sloped lateral surfaces are obtained as shown in FIG. 1(b). For example, the etching is realized by immersing a base 18 that includes the porous alumina layer 10 in a 1 M phosphoric acid aqueous solution at 30° C. for 20 minutes.

Then, the anodization is performed again, whereby minute recessed portions 12c with an increased depth are formed as shown in FIG. 1(c). For example, a porous alumina layer that has $D_{int}$ which corresponds to the forming voltage of 60 V and that has a thickness which corresponds to the accumulated quantity of electricity of 100 C (coulomb) is formed in a 0.1 M oxalic acid aqueous solution (20° C.) using the aluminum base 18 as the anode. In the second and subsequent cycles of the anodization step which are performed after the etching step, an electric current cannot flow without application of a somewhat high voltage because the porous alumina layer (including a barrier layer) has been formed over the surface of the aluminum base. In this example, as seen from FIG. 2, when a voltage of not less than 40 V is applied, an electric current flows so that the anodization can be performed. Here, in the case of linearly sloping the lateral surfaces of the minute recessed portions, the accumulated quantity of electricity, Q, is monitored during application of a voltage, and the voltage is controlled such that voltage E satisfies E=0.2×Q+40. Thereafter, when necessary, the etching step is performed. Further, another cycle of the anodization step may be performed. Lastly, the process may be finished with the etching step. In this way, recessed portions 12d are formed as shown in FIG. 1(d).

FIG. 3(a) is a cross-sectional SEM image of a minute recessed portion of a porous alumina layer which was formed according to a method of an example of the present invention. FIG. 3(b) is a cross-sectional SEM image of a minute recessed portion of a porous alumina layer which was formed according to a conventional method. The magnification of the SEM images was 80,000, and the depth of the minute recessed portions was about 160 nm.

The porous alumina layer shown in FIG. 3(a) was obtained by alternately performing 3 cycles of the anodization step and 2 cycles of the etching step under the conditions exemplified above.

For the porous alumina layer shown in FIG. 3(b), the forming voltage was not varied but was constant at 60 V in the above-described first to third cycles of the anodization step. In each of the first to third cycles of the anodization step, the accumulated quantity of electricity, Q, was 100 C.

As clearly seen from the comparison of FIG. 3(a) with FIG. 3(b), two steps are clearly observed in the lateral surface of the recessed portion of the porous alumina layer that was formed according to the conventional method, whereas in the porous alumina layer which was formed according to the method of the inventive example, the lateral surface of the recessed portion is smoothly and continuously sloped and is substantially free from steps. Note that the reason why the steps of the minute recessed portion shown in FIG. 3(b) are not clear is that the etching advances relatively isotropically.

Figure 4:
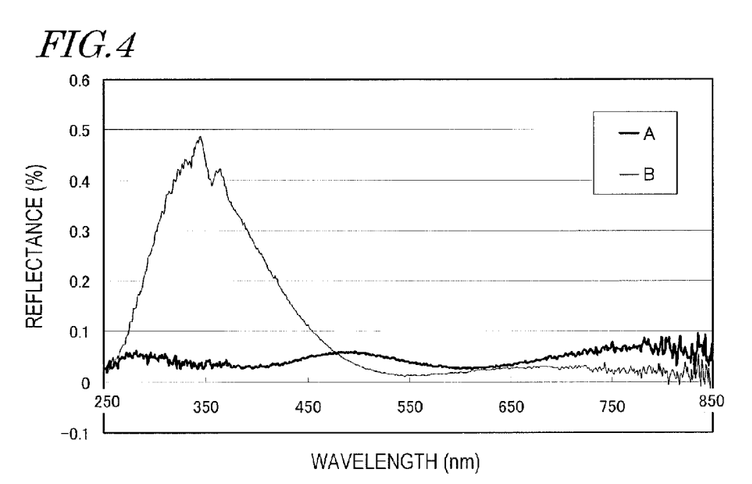
FIG. 4 A graph which illustrates the spectral reflectance of antireflection films that were produced using the porous alumina layers that have the minute recessed portions shown in FIGS. 3(a) and 3(b).

The spectral reflectances of antireflection films which were produced using porous alumina layers which have minute recessed portions shown in FIGS. 3(a) and 3(b) are shown in FIG. 4. In FIG. 4, curve A represents the spectral reflectance of the antireflection film that was produced using the porous alumina layer that was formed according to the method of the inventive example, and curve B represents the spectral reflectance of the antireflection film that was produced using the porous alumina layer that was formed according to the conventional method. In the production of the antireflection films, an acrylic photocurable resin was used. The measurement of the spectral reflectance was carried out using an optical system in which light incoming at 5° is received by the front face (in a direction normal to the antireflection film).

As seen from FIG. 4, both of the antireflection films exhibited low reflectances, which were not more than 0.5%. However, the spectral reflectance of the antireflection film that was produced using the porous alumina layer that was formed according to the conventional method (curve B) had a large peak at 350 nm, with the foot of the peak overlapping the visible light wavelength range ($\lambda$=380 nm to 780 nm). As a result, when this reflection film was observed by a human eye, it appeared bluish. On the other hand, the spectral reflectance of the antireflection film that was produced using the porous alumina layer that was formed according to the method of the inventive example (curve A) was very low, specifically not more than 0.1%, over the entire visible light wavelength range, and the antireflection film did not appear to have a hue. The reason why the spectral reflectance of the antireflection film that was produced using a porous alumina layer that was formed according to the conventional method had a peak is that the recessed portions have steps such as seen in the SEM image shown in FIG. 3(b). With the steps, reflected light causes interference, so that the reflectance of a particular wavelength range can increase.

By forming a porous alumina layer according to a method of the embodiment of the present invention as described above, minute recessed portions with sloped lateral surfaces, which are substantially free from steps, can be formed. Further, the method of the embodiment of the present invention can be realized only by varying the forming voltage during the anodization in the conventional method and therefore can be easily carried out.

INDUSTRIAL APPLICABILITY

The present invention is applicable to a method for forming an anodized layer over an aluminum base or an aluminum layer, a mold manufacturing method, and a mold. The present invention is suitably applicable to, particularly, manufacture of a moth-eye mold which is for production of an antireflection film.

REFERENCE SIGNS LIST 10 porous alumina layer
12, 12a, 12b, 12c, 12d minute recessed portions (micropores)
18 aluminum base

The invention claimed is:
1. A method for forming an anodized layer, comprising:
step (a) of providing an aluminum base or an aluminum film deposited on a support;
anodization step (b) in which a forming voltage is increased to a predetermined first voltage level under a predetermined condition with a surface of the aluminum base or a surface of the aluminum film being kept in contact with an electrolytic solution, and thereafter, the forming voltage is maintained at the first voltage level for a predetermined period of time, whereby a porous alumina layer which has a minute recessed portion is formed;
etching step (c) in which, after step (b), the porous alumina layer is brought into contact with an etching solution, whereby the minute recessed portion is enlarged and a lateral surface of the minute recessed portion is sloped; and
a second cycle of step (b) after step (c), wherein the forming voltage applied at a start of the second cycle of step (b) is higher than the forming voltage applied at a start of the first cycle of step (b), wherein
in the second cycle of step (b), the forming voltage is increased to the first voltage level by monitoring an accumulated quantity of electricity Q during application of the forming voltage, and controlling the forming voltage E such that the forming voltage E satisfies $E=0.2 \times Q+40$.
2. The method of claim 1, wherein the first voltage level is not less than 20 V and less than 100 V.

* * * * *